United States Patent
Biggs et al.

(10) Patent No.: US 6,865,507 B2
(45) Date of Patent: Mar. 8, 2005

(54) THICKNESS GAUGE FOR MEAT PRODUCTS

(76) Inventors: Henry Biggs, 718 E. Airport Rd., Gallatin, TN (US) 37066; Steve Korteley, 718 E. Airport Rd., Gallatin, TN (US) 37066

( * ) Notice: Subject to any disclaimer, the term of this patent is extended or adjusted under 35 U.S.C. 154(b) by 0 days.

(21) Appl. No.: 10/607,384

(22) Filed: Jun. 26, 2003

(65) Prior Publication Data

US 2004/0267496 A1 Dec. 30, 2004

(51) Int. Cl.[7] .............................................. G01B 11/02
(52) U.S. Cl. ........................................ 702/170; 33/506
(58) Field of Search ........................... 702/170; 33/506, 33/556, 558

(56) References Cited

U.S. PATENT DOCUMENTS 4,505,042 A * 3/1985 Nishina ...................... 33/505

FOREIGN PATENT DOCUMENTS

FR 2584914 A * 1/1987

OTHER PUBLICATIONS

Grainger Cat. 389, 1998, p. 1810–1811.*
Mitutoyo Catalog 2000A, p. R–86 and R–87.*

* cited by examiner

Primary Examiner—John Barlow
Assistant Examiner—Stephen J. Cherry
(74) Attorney, Agent, or Firm—Adam H. Jacobs

(57) ABSTRACT

In combination, a meat product selected from the group consisting of beef, pork, chicken, turkey, fowl and fish and a thickness gauge for meat products. The thickness gauge includes a base platform and a generally upright stand mounted on the base platform. A thickness gauge support arm is pivotably and height adjustably mounted on the generally upright stand, the thickness gauge support arm further includes a pivoting elbow formed therein. A digital thickness gauge is mounted on the outer end of the thickness gauge support arm, the digital thickness gauge including a vertically adjustable indicator head for engaging the meat product. Finally, the digital thickness gauge is operative to measure the thickness of the meat product by the computing the distance of vertical movement of the indicator head of the digital thickness gauge.

5 Claims, 2 Drawing Sheets

THICKNESS GAUGE FOR MEAT PRODUCTS

BACKGROUND OF THE INVENTION

1. Technical Field

The present invention relates to thickness gauges and, more particularly, to a thickness gauge for meat products which includes a base platform, a generally upright stand, a thickness gauge support arm which is pivotably and height-adjustably mounted on the generally upright stand and a digital thickness gauge mounted on the thickness gauge support arm, the digital thickness gauge operative to quickly and accurately measure the thickness of a meat product supported on the base platform.

2. Description of the Prior Art

In the meat processing industry, many different types of meat products are processed from all types of meat, be it beef, pork, chicken, turkey, foul or fish. The methods of processing for each of these types of meats can very greatly, but, if there is one thing in common to each of the processing techniques used in connection with these various types of meats, it is the desire to reduce waste and increase efficiency to maximize the saleable meats produced via processing. Various machines and devices have been proposed to increase efficiency and decrease waste in the production of meat products. In general, these devices are designed to effectively trim fat and remove bone from the meat products to enhance and simplify the production of the meat product, but, in general, very few of the prior art devices are specifically designed to increase quality control and thus address efficiency from the improvement of quality of the meat product. Therefore, there is a need for a product which, when used during the production of meat products, will assist in the improvement of quality without substantially delaying or impeding the meat production line.

When the various meat products are produced in the meat production facility, there are some products which must be cut in certain ways or in a certain thickness as per the customer's specifications. While there are some devices in the prior art which permit adjustment of slice thickness, the production team then generally must assume that the slices produced by the machine are of the proper thickness and send them to the customer without further inspection. If, however, the slices are of incorrect thickness, it is then the responsibility of the customer to adjust the thickness by removing some of the meat product or discarding the slices if they are too thin, thus resulting in increased time and effort required to render the meat products saleable. There is therefore a need for a device which can be used to quickly and easily measure the thickness of meat products to ensure quality control and decrease waste.

Therefore, an object of the present invention is to provide a thickness gauge for meat products.

Another object of the present invention is to provide a thickness gauge for meat products which include a base platform and a generally upright stand mounted on the base platform with a thickness gauge support arm extending outwards from the generally upright stand to support a digital thickness gauge suspended above the base platform.

Another object of the present invention is to provide a thickness gauge for meat products in which the digital thickness gauge includes a vertically adjustable indicator head which engages the top surface of the meat product when the meat product is placed on the base platform to determine the thickness of the meat product and enhance the saleability of the meat product.

Another object of the present invention is to provide a thickness gauge for meat products which may be quickly and easily operated and which will not hinder the speed with which the meat product is manufactured.

Finally, an object of the present invention is to provide a thickness gauge for meat products which is relatively simple in construction and is safe and efficient in use.

SUMMARY OF THE INVENTION

The present invention provides in combination, a meat product selected from the group consisting of beef, pork, chicken, turkey, fowl and fish and a thickness gauge for meat products. The thickness gauge includes a base platform and a generally upright stand mounted on the base platform. A thickness gauge support arm includes a first end and a second end, the first end of the thickness gauge support arm pivotably and height adjustably mounted on the generally upright stand, the thickness gauge support arm further includes a pivoting elbow intermediate the first end and the second end. A digital thickness gauge is mounted on the second end of the thickness gauge support arm positionable above the base platform, the digital thickness gauge including a vertically adjustable indicator head for engaging the meat product. Finally, the digital thickness gauge is operative to measure the thickness of the meat product by the indicator head being moved into engagement with the meat product positioned below the digital thickness gauge and on the base platform such that the thickness of the meat product is given by the distance of vertical movement of the indicator head of the digital thickness gauge.

The present invention addresses and corrects many of the disadvantages found in the prior art. For example, the use of the digital thickness gauge will greatly reduce waste and inefficiency in the production of sliced meat products for which a particular thickness is desired. Furthermore, the relatively simple design of the present invention virtually ensures that the unit will have a relatively long usable lifespan and does not require specialized training to learn to use it, which is a boon to meat processing companies. Also, as the present invention quickly provides a reading on the thickness of the meat product, it can be used during the processing of the meat product without slowing or impeding the processing line. It is therefore seen that the present invention provides a substantial improvement over those devices found in the prior art.

DESCRIPTION OF THE PREFERRED EMBODIMENT

Figure 1:
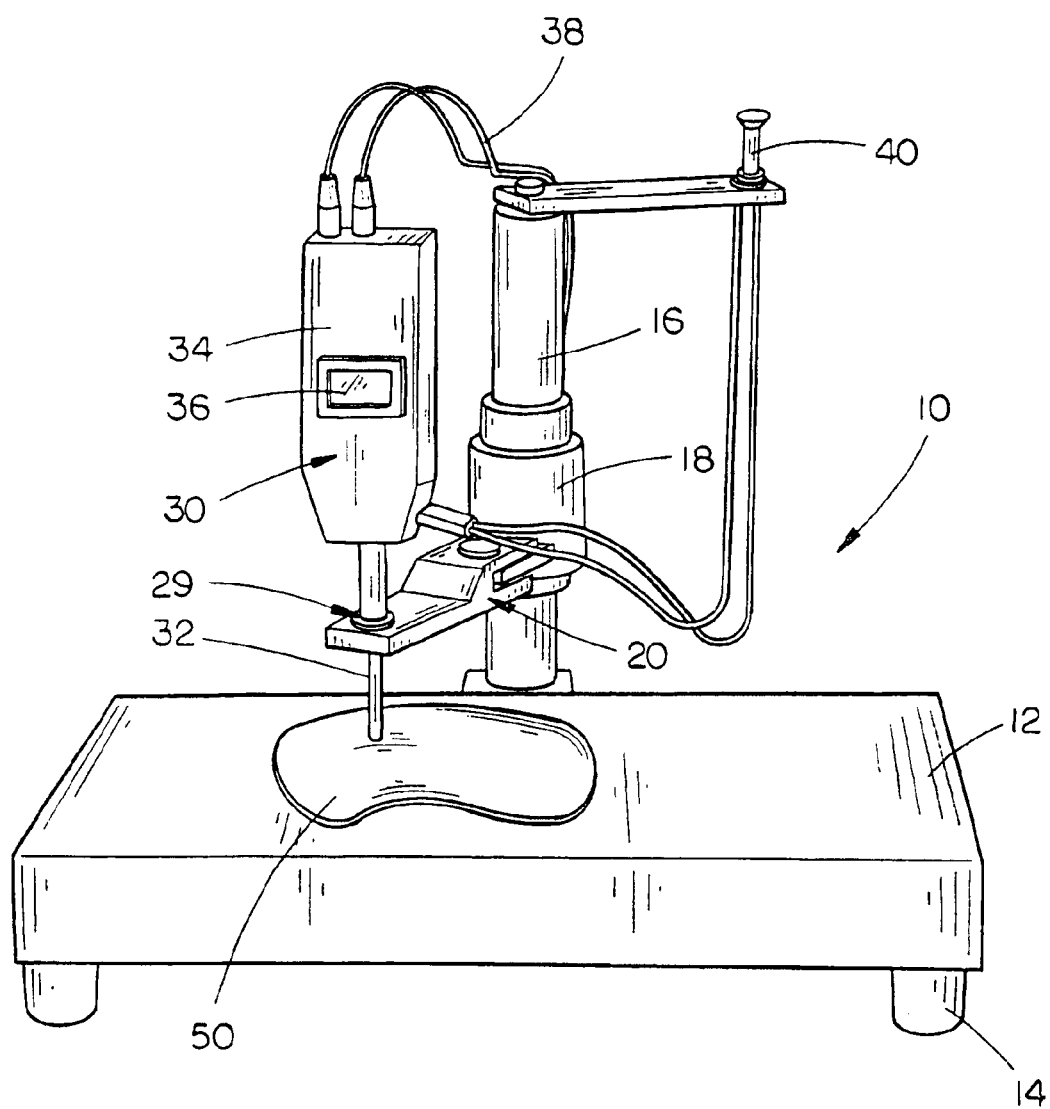
FIG. 1 is a prospective view of the thickness gauge for meat products of the present invention.
Figure 2:
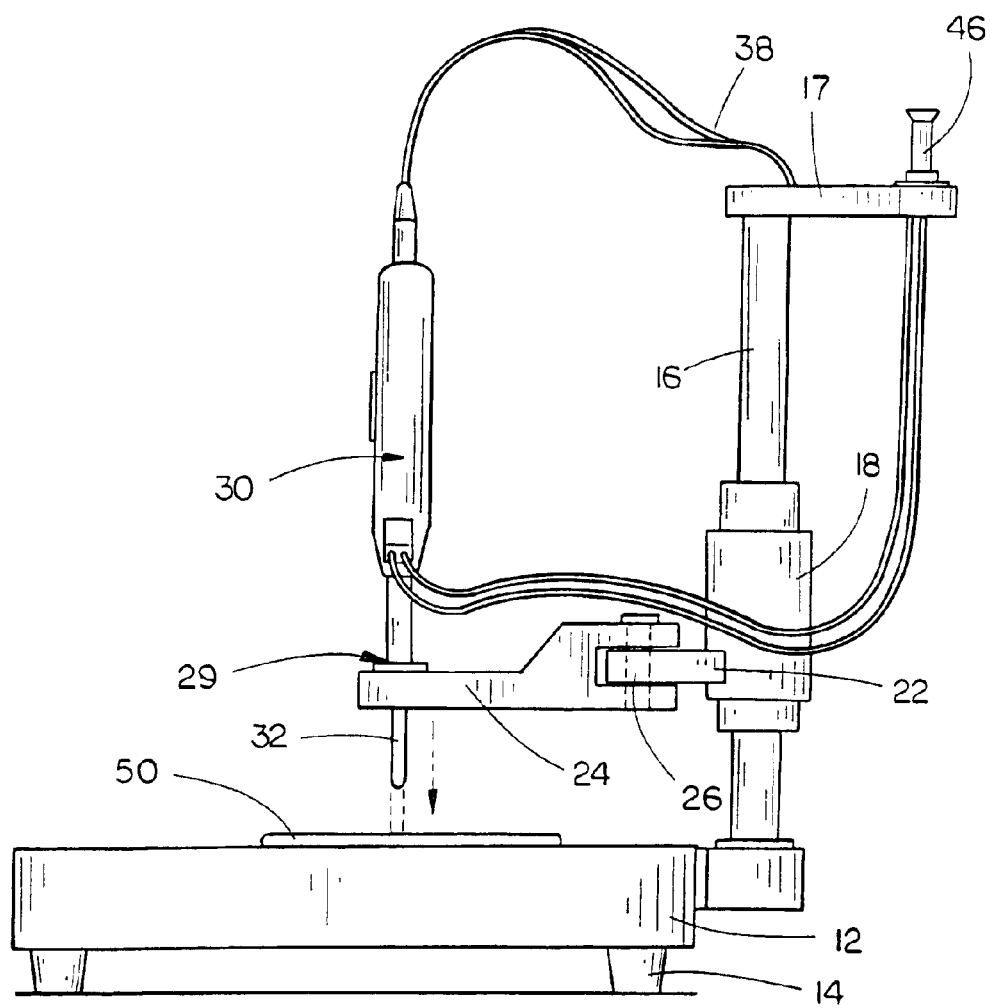
FIG. 2 is a side elevational view of the thickness gauge of the present invention showing the thickness gauge in operation.

The thickness gauge 10 of the present invention is shown best in FIGS. 1 and 2 as including a generally rectangular base platform 12 on the bottom of which are mounted a plurality of platform legs 14 which elevate the base platform 12 above the floor or table surface on which it is placed. In the preferred embodiment, the base platform 12 and platform legs 14 would be constructed of a molded plastic material such as UHMW which would provide an extended operating life span and facilitate cleaning of the base platform 12 and platform legs 14 after use. Of course, it should be noted that many different types of construction materials may be used with the present invention, including PVC plastic and stainless steel.

Mounted on the rear of base platform 12 and extending upwards therefrom is a generally upright stand 16 which, in the preferred embodiment, would be a stainless steel tube or rod having a height of approximately 6 to 18 inches and a diameter of approximately ½ inch to 1 inch, depending on the thickness of the stand 16 and the structural strength desired. Adjustably and pivotally mounted on the generally upright stand 16 is a support arm connection sleeve 18 which may be slid upwards and downwards on generally upright stand 16 to adjust the vertical positioning of the support arm connection sleeve 18 and furthermore may rotate about the generally upright stand 16 to provide a pivoting motion to elements mounted on the support arm connection sleeve 18. Various types of braking and securing devices may be used in connection with the support arm connection sleeve 18 to the present invention for releasably securing the support arm connection sleeve 18 on the generally upright stand 16, any of which are commonly used in the art and would be understood by one skilled in the art. It should be noted, however, that the quick and simple vertical adjustment and pivotable mounting of the support arm connection sleeve 18 on generally upright stand 16 is a somewhat important feature of the present invention, in that it permits safe, fast, and accurate adjustment of the height and positioning of the thickness gauge for various types of meat product.

Mounted on and extending generally perpendicular to support arm connection sleeve 18 is a thickness gauge support arm 20 which, in the preferred embodiment, would include inner and outer arm sections 22 and 24 pivotally connected to one another at joint 26, as shown best in FIGS. 1 and 2. The inner section 22 of thickness gauge support arm 20 would preferably be welded to support arm connection sleeve 18 to form a solid and sturdy connection to the support arm connection sleeve 18. Furthermore, it is preferred that thickness gauge support arm 20 have an overall length of approximately 4 to 10 inches in order to properly space the digital thickness gauge 30 from the generally upright stand 16 so that a large variety of meat products may be measured using the thickness gauge 10 of the present invention.

The digital thickness gauge 30 which provides the readout of slice thickness would preferably be mounted on the second end 28 of outer section 24 of thickness gauge support arm 20, as shown best in FIGS. 1 and 2. It is preferred that outer end 28 of outer section 24 of thickness gauge support arm 20 include a generally vertical gauge support hole 29, and it is though this generally vertical gauge support hole 29 that the digital thickness gauge 30 and particularly the vertically adjustable indicator head 42 of digital thickness gauge 30 would be extended. The hole 29 would preferably be formed such that the digital thickness gauge 30 fits into and is snugly received within the vertical hole 29 to support the digital thickness gauge 30 in the readout position shown best in FIG. 1 while simultaneously permitting easy removal of the digital thickness gauge 30 from the thickness gauge support arm 20 should adjustment or repair of the digital thickness gauge 30 become necessary.

The digital thickness gauge 30 of the present invention preferably includes a plastic body 34 having a digital readout 36 mounted therein, the digital readout 36 connected via a programmed microchip (not shown) mounted within the body 34 of digital thickness gauge 30 to the vertically adjustable indicator head 32 such that the positioning of vertically adjustable indicator head 32 is translated into a distance readout displayed on digital thickness gauge 30, particularly by the digital readout 36. Power to the digital thickness gauge 30 is supplied by wires 38 connected to body 34, the wires 38 being plugged into any available power source such as a battery or wall socket outlet.

Finally, immediately prior to reading the thickness of meat product 50 placed on base platform 12, it is necessary to move the vertically adjustable indicator head 32 out of the way to permit the meat product 50 to be slid underneath the digital thickness gauge 30. For this purpose, an indicator head engagement and disengagement button 40 would preferably be mounted atop generally upright stand 16 on a button support bar 17, the engagement and disengagement button 40 operating in the following manner. When button 40 is depressed, vertically adjustable indicator head 32 is lifted upwards into digital thickness gauge 30 to move the indicator head 32 from engagement with a meat product 50 and permit the next meat product to be measured to be slid underneath the digital thickness gauge 30. When engagement and disengagement button 40 is released, the vertically adjustable indicator head 32 is then released downwards until it engages the meat product 50, thus enabling the digital thickness gauge 30 to read the thickness of the meat product 50. Of course, it should be noted that many different kinds of engagement and disengagement devices may be used with the present invention so long as the intended function of protecting the vertically adjustable indicator head 32 during transfer of meat product from the base platform 12 is maintained, including remote control devices and other such devices.

In operation, the thickness gauge 10 of the present invention would be used in the following manner. Engagement and disengagement button 40 would be depressed raising vertically adjustable indicator head 32 upwards to permit the meat product 50 to be slid underneath digital thickness gauge 30. Alternatively, upon pressing engagement and disengagement button 40 to lift vertically adjustable indicator head 32, the position of digital thickness gauge 30 may be changed by swinging digital thickness gauge 30 out of the way using either the joint 26 on thickness gauge support arm 20 or by rotating support arm connection sleeve 18 about generally upright stand 16, thus swinging digital thickness gauge 30 out of the way of the incoming meat product 50. Once the meat product 50 is placed on the base platform 12, the digital thickness gauge 30 would be positioned over the meat product 50 and engagement and disengagement button 40 would be released, thus permitting vertically adjustable indicator head 32 to descend to contact the upper surface of meat product 50. The vertical position of thickness gauge support arm 20 and support arm connection sleeve 18 on generally upright stand 16 is fed into the digital thickness gauge 30 or, alternatively, immediately prior to placement of the meat product 50 on base platform 12, the indicator head 32 is placed in contact with the upper surface of base platform 12 to generate a base reading relative to which the height of vertically adjustable indicator head 32 there above is used to determine the thickness of meat product 50. In either event, when the vertically adjustable indicator head 32 contacts the upper surface of meat product 50, the thickness of meat product 50 is shown on digital readout 36 and the operator of the present invention may determine if the slice thickness of the meat product 50 is acceptable or if adjustments to the slice thickness of meat product 50 must be made. This information can then be passed on to other operators of other machines in the meat processing plant to ensure quality control and thus greatly reduce waste and inefficiency. By merely depressing engagement and disengagement button 40, the operator of the thickness gauge 10 of the present invention prepares the thickness gauge 10 for the next meat product to be measured, and it is thus seen that rapid measurement of the thickness of meat product is enabled to prevent slowing down of the processing line. Finally, to accommodate different varieties of meat products, the height of the thickness gauge support arm 20 may be changed by adjusting the vertical position of the support arm connection sleeve 18 on generally upright stand 16.

It is to be understood that numerous modifications, additions and substitutions may be made to the thickness gauge 10 of the present invention which fall within the intended broad scope of the appended claims. For example, although the digital thickness gauge 30 of the present invention has been described as including several features, such as the vertically adjustable indicator head 32 and digital readout 36, it may be preferable in some instances to substitute a traditional thickness reading device which does not incorporate digital technology or a thickness measuring device which does not include a vertically adjustable indicator head 32 or that substitutes another thickness measuring device for that indicator head. Substitution of any of these various types of measuring devices is contemplated herein and would be understood by one skilled in the art as being usable with the present invention. Furthermore, the precise size, shape, and construction materials used in connection with the thickness gauge 10 of the present invention are not critical so long as the intended functional characteristics are maintained. Finally, although the present invention is described for use in measuring the thickness of meat product, various other dimensions of meat products may be measured using the present invention, depending on the quality control characteristics which are desired by the users of the invention.

There has therefore been shown and described a thickness gauge 10 which accomplishes at least all of its intended objectives.

We claim:

1. In combination:
   a meat product selected from the group consisting of beef, pork, fowl and fish; and
   a thickness gauge for meat products including;
   a base platform;
   a generally upright stand mounted on said base platform;
   a thickness gauge support arm having a first end and a second end, said first end of said thickness gauge support arm pivotably and height adjustably mounted on said generally upright stand, said thickness gauge support arm including a pivoting elbow intermediate said first end and said second end;
   a digital thickness gauge mounted on said second end of said thickness gauge support arm positionable above said base platform, said digital thickness gauge including a vertically adjustable indicator head for engaging said meat product;
   an indicator head engagement and disengagement mechanism operative to alternatively lift and drop said indicator head of said digital thickness gauge between a lifted position free from engagement with said meat product therebeneath to an engagement position engaging said meat product, thus enabling said digital thickness gauge to read the thickness of said meat product, said indicator head engagement and disengagement mechanism further including an indicator head engagement and disengagement button mounted on said generally upright stand;
   said digital thickness gauge operative to measure the thickness of said meat product by said indicator head being moved into engagement with said meat product positioned below said digital thickness gauge and on said base platform such that the thickness of said meat product is given by the distance of vertical movement of said indicator head of said digital thickness gauge.

2. The combination of claim 1 wherein said thickness gauge support arm further comprises a generally vertical gauge support hole formed in said second end of said thickness gauge support arm, said generally vertical gauge support hole operative to support and retain said digital thickness gauge therewithin and permit said indicator head of said digital thickness gauge to extend therethrough.

3. The combination of claim 1 wherein said digital thickness gauge further includes a body having a digital readout mounted therein, said digital readout connected via a programmed microchip mounted within said body to said vertically adjustable indicator head such that the positioning of said vertically adjustable indicator head is translated into a distance readout displayed on said digital thickness gauge, particularly on said digital readout.

4. The combination of claim 1 further comprising a support arm connection sleeve vertically slidably and rotatably mounted on said upright stand, said thickness gauge support arm mounted on and extending outwards from said support arm connection sleeve.

5. A thickness gauge for meat products comprises:
   a base platform;
   a generally upright stand mounted on said base platform;
   a thickness gauge support arm having a first end and a second end, said first end of said thickness gauge support arm pivotably and height adjustably mounted on said generally upright stand, said thickness gauge support arm including a pivoting elbow intermediate said first end and said second end;
   a digital thickness gauge mounted on said second end of said thickness gauge support arm positionable above said base platform, said digital thickness gauge including a vertically adjustable indicator head for engaging a meat product;
   an indicator head engagement and disengagement mechanism operative to alternatively lift and drop said indicator head of said digital thickness gauge between a lifted position free from engagement with a meat product therebeneath to an engagement position engaging a meat product, thus enabling said digital thickness gauge to read the thickness of a meat product, said indicator head engagement and disengagement mechanism further including an indicator head engagement and disengagement button mounted on said generally upright stand;
   said digital thickness gauge operative to measure the thickness of said meat product by said indicator head being moved into engagement with a meat product positioned below said digital thickness gauge and on said base platform such that the thickness of a meat product is given by the distance of vertical movement of said indicator head of said digital thickness gauge.

* * * * *